(12) United States Patent
Rasmussen

(10) Patent No.: US 9,204,712 B2
(45) Date of Patent: Dec. 8, 2015

(54) METHOD OF MAKING A HYGIENIC BRUSH HEAD

(71) Applicant: Vikan A/S, Skive (DK)

(72) Inventor: Børge Rasmussen, Skive (DK)

(73) Assignee: Vikan A/S, Skive (DK)

(*) Notice: Subject to any disclaimer, the term of this patent is extended or adjusted under 35 U.S.C. 154(b) by 0 days.

(21) Appl. No.: 14/380,204

(22) PCT Filed: Feb. 22, 2013

(86) PCT No.: PCT/EP2013/053571
§ 371 (c)(1),
(2) Date: Aug. 21, 2014

(87) PCT Pub. No.: WO2013/124424
PCT Pub. Date: Aug. 29, 2013

(65) Prior Publication Data
US 2015/0013090 A1    Jan. 15, 2015

(30) Foreign Application Priority Data

Feb. 24, 2012  (DK) ................................. 2012 70087
Feb. 24, 2012  (DK) ................................. 2012 70088

(51) Int. Cl.
| | |
|---|---|
| *A46B 3/00* | (2006.01) |
| *A46B 3/06* | (2006.01) |
| *A46D 3/00* | (2006.01) |
| *B29C 45/14* | (2006.01) |
| *B29C 45/16* | (2006.01) |
| *A46D 1/00* | (2006.01) |
| *A46D 1/04* | (2006.01) |

(52) U.S. Cl.
CPC . *A46B 3/005* (2013.01); *A46B 3/06* (2013.01); *A46D 1/0207* (2013.01); *A46D 1/04* (2013.01);

(Continued)

(58) Field of Classification Search
CPC ..... A46B 3/005; A46D 3/005; A46D 1/0207; A46D 1/04
See application file for complete search history.

(56) References Cited

U.S. PATENT DOCUMENTS

| | | | |
|---|---|---|---|
| 3,945,080 | A | 3/1976 | Hamner |
| 5,045,267 | A | 9/1991 | Weihrauch |

(Continued)

FOREIGN PATENT DOCUMENTS

| | | |
|---|---|---|
| DE | 35 01 098 A1 | 7/1986 |
| DE | 38 20 372 A1 | 12/1989 |

(Continued)

OTHER PUBLICATIONS

International Search Report completed Jun. 24, 2013 for International Application No. PCT/EP2013/053571.

*Primary Examiner* — Shay Karls
(74) *Attorney, Agent, or Firm* — Brinks Gilson & Lione

(57) ABSTRACT

Disclosed is a method of manufacturing a hygienic brush head for cleaning articles, where the brush head comprises a plurality of flexible bristle filaments extending in a longitudinal direction grouped into flexible sweeping elements being connected to a molded brush head body, the method comprising: •collecting the flexible bristle filaments in a grouping module creating at least one group of flexible sweeping elements, •melting one end of the at least one group of flexible sweeping elements using a melting module, creating a melted end, •gliding the flexible sweeping elements positioned in the grouping module away from the melting module in a direction substantially perpendicularly to the longitudinal direction of the flexible bristle filaments, •positioning a plurality of the groups of flexible sweeping elements in a mold, and performing a first brush head molding of a brush head body around the plurality of the groups of flexible sweeping elements, •performing a second brush head molding around the brush head body, creating a hygienic brush head.

12 Claims, 8 Drawing Sheets

(52) U.S. Cl.
CPC .......... *A46D 3/005* (2013.01); *B29C 45/14377* (2013.01); *B29C 45/14385* (2013.01); *B29C 45/1615* (2013.01); *B29C 45/1671* (2013.01); *A46B 2200/302* (2013.01); *B29C 45/14311* (2013.01)

(56) References Cited

U.S. PATENT DOCUMENTS

| | | | |
|---|---|---|---|
| 6,330,730 B1 * | 12/2001 | Davies et al. | ................ 15/167.1 |
| 6,832,819 B1 | 12/2004 | Weihrauch | |
| 8,915,552 B2 * | 12/2014 | Birk et al. | ...................... 300/21 |
| 2001/0013152 A1 | 8/2001 | Meyer et al. | |
| 2010/0043165 A1 | 2/2010 | Juentgen et al. | |
| 2010/0117440 A1 | 5/2010 | Ebner | |
| 2012/0013169 A1 | 1/2012 | Rees | |
| 2013/0291320 A1 * | 11/2013 | Kirchhofer et al. | ............ 15/22.1 |

FOREIGN PATENT DOCUMENTS

| | | |
|---|---|---|
| DE | 38 32 520 A1 | 4/1990 |
| EP | 0 142 885 A2 | 5/1985 |
| EP | 0 972 465 A1 | 1/2000 |

\* cited by examiner

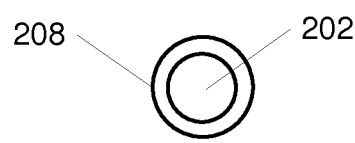
Fig. 5a
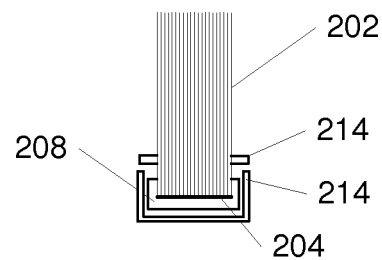
Fig. 5b
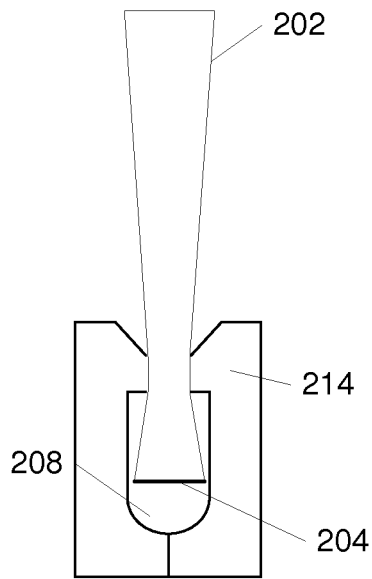 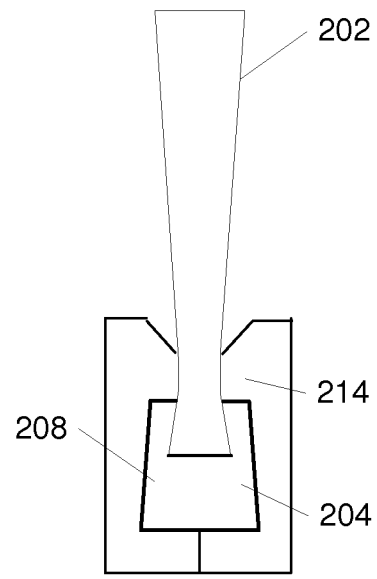
Fig. 5c  Fig. 5d

METHOD OF MAKING A HYGIENIC BRUSH HEAD

This application claims the benefit under 35 U.S.C. §371 of International Application No. PCT/EP2013/053571, filed Feb. 22, 2013, which claims the benefit of Danish Patent Application No. PA201270087, filed Feb. 24, 2012, and Danish Patent Application No. PA201270088, filed Feb. 24, 2012, which are incorporated by reference herein in their entirety.

The present invention relates to a method of making a hygienic brush head comprising collecting flexible bristle filaments in a grouping module creating at least one group of flexible sweeping elements, melting one end of the at least one group of flexible sweeping elements using a melting module, creating a melted end, gliding the flexible sweeping elements positioned in the grouping module away from the melting module in a direction substantially perpendicularly to the longitudinal direction of the flexible bristle filaments, positioning a plurality of the groups of flexible sweeping elements in a mould, and performing a first brush head moulding of a brush head body around the plurality of the groups of flexible sweeping elements and performing a second brush head moulding of the brush head body, thereby creating a hygienic brush head. The invention also concerns a—hygienic brush head manufactured by the method and a broom comprising a—hygienic brush head according to the present invention.

BACKGROUND

The present invention, in general, relates to a brush head or broom for sweeping dirt on a surface. The invention relates specifically to a brush head or broom with sweeping elements consisting of hair-like elements, also called bristle filaments, collected in groups.

In general, a broom is a tool used to clean up a surface by sweeping the dirt into a dustpan or dustbin. A conventional broom comprises a brush head, a broom stick and sweeping elements positioned on the brush head. Usually, a sweeping element is a plurality of hair-like elements (bristles) and the broom stick is fixed at a particular position on top of the brush head, and the sweeping elements protrude from the bottom of the brush head. Generally, these sweeping elements are made of a flexible material.

FIG. 1 shows a conventional broom (prior art). The broom (100) comprises a broom stick (not shown), a brush head (102) and flexible sweeping elements (104). The broom stick is to be attached to a top end of the brush head (102) and the flexible sweeping elements (104) are positioned on the brush head (102). Also, the sweeping elements protrude from the bottom end of the brush head (102) in order to contact the surface during sweeping. The sweeping elements can be groups of flexible hair-like elements.

Prior art brooms generally contain groups of flexible hair-like elements that are collected in groups by way of gluing or threading a ring upon the hair-like elements. A brush head can then be moulded around the hair-like elements. The moulding process allows positioning of hair-like elements in groups in a mould, thereby eliminating the need to insert the hair-like elements into the holes or grooves of the brush head. However, a problem with prior art brooms, where the sweeping elements are groups of flexible hair-like elements, is that some of the hair-like elements in the individual sweeping elements loosen when the broom is used, especially center hairs in each individual sweeping element have the tendency to fall off the broom during use. In other words, during the moulding of a brush head, each bristle positioned on the outer boundary of the group is bonded all around with the moulding material, whereas bristles in the inner section of the group are loosely bound as compared with those on the periphery of the group. Therefore, the group keeps losing bristles from the inner section over a period of use.

Another problem with prior art brooms is that dirt can hide in cracks and holes around the hairs in the sweeping elements and in cracks and holes between individual mouldings. Thus, there is a need for a better brush head-making method. In particular there is a need for a better way of producing hygienic or even super hygienic brush heads.

US 2010/0117440 discloses a brush manufacturing machine comprising two injection moulding steps. The bristle bundles are profiled and the ends cut to the same length before the bristle bundles are fused at the one end. A material is injection moulded around the fused end of the bristle bundles to form a thin-walled plate as bristle carrier. A second moulding around the bristle carriers results in a brush head being formed.

The drawbacks of US 2010/0117440 is that when the melting is accomplished the melting unit may accidentally pull out threads from the bristle filaments or pull up the whole sweeping element from the cardboard that they are positioned in when the melting is finished and the melting unit is lifted up. Another drawback is that all the individual bristle filaments might not be fused together completely or that the melted end is being over-melted.

An object of the present invention is to provide an alternative brush head manufacturing method that solves the above mentioned hygiene problems.

SUMMARY OF INVENTION

This is obtained, in a first aspect of the invention, by a method of manufacturing a hygienic brush head for cleaning articles, where the brush head comprises a plurality of flexible bristle filaments extending in a longitudinal direction grouped into flexible sweeping elements being connected to a moulded brush head body, the method comprising:
  collecting the flexible bristle filaments in a grouping module creating at least one group of flexible sweeping elements,
  melting one end of the at least one group of flexible sweeping elements using a melting module, creating a melted end,
  gliding the flexible sweeping elements positioned in the grouping module away from the melting module in a direction substantially perpendicularly to the longitudinal direction of the flexible bristle filaments,
  positioning a plurality of the groups of flexible sweeping elements in a mould, and performing a first brush head moulding of a brush head body around the plurality of the groups of flexible sweeping elements,
  performing a second brush head moulding of the brush head body, thereby creating a hygienic brush head.

The hygienic brush head can also be a broom. The difference between a brush head and a broom is that a broom may have a handle. The handle is preferably moulded as part of the second brush head moulding of the intermediate brush head. However, the handle may also be attached to the hygienic brush head in any other suitable way.

Thereby, by melting and fusing the hair-like elements together in one end before moulding the brush head body around the groups of hair-like elements, it is secured that each specific hair-like element are interconnected in groups, securing that the hair-like elements in the individual sweeping elements do not loosen when the brush head is used. Especially it is secured that the non-peripheral (inner) flexible hair-like elements, which in prior art brooms have a tendency to fall out, do not fall off the brush head during use.

It is found that the method results in a brush head with a surface that appears as one "continuous" and "closed" surface that does not collect dirt, particles, bacteria and alike or at least reduces or significantly reduces the collection and accumulation of such or equally important provides a brush head with a surface that is easily cleanable. Thus the method provides a hygienic or even super hygienic brush head.

By gliding the flexible sweeping elements positioned in the grouping module away from the melting module in a direction substantially perpendicularly to the longitudinal direction of the flexible bristle filaments it is obtained that the melting module does not accidental pull out threads from the bristle filaments or pull up the whole sweeping element from the grouping module that they are positioned in when the melting is finished and the melting module is transferred back to its initial place, ready for a new cycle round. By gliding/turning the flexible sweeping elements relative to the melting module the filaments are fused together more thorough, since the flexible sweeping elements positioned in the grouping module are still in contact with the melting module during the gliding. The melting ensures that all the bristle filaments are melted without being over-melted ensuring a smooth surface of the end that has been melted. The result of the melting is that the finish of the surface of the end of the bundle that has been melted is smooth an even and that all the individual bristle filaments are fused together so that the bristle filaments in the individual sweeping elements do not loosen when the brush head is used.

In one embodiment the gliding of the flexible sweeping elements positioned in the grouping module away from the melting module in a direction substantially perpendicularly to the longitudinal direction of the flexible bristle filaments comprises gliding apart the flexible sweeping elements positioned in the grouping module and the melting module substantially perpendicularly to the longitudinal direction of the flexible bristle filaments.

In one embodiment when the flexible sweeping elements positioned in the grouping module are glided away from the melting module in a direction substantially perpendicularly to the longitudinal direction of the flexible bristle filaments and the melting is finished, the melting unit is lifted and moved away from the place of melting and is transferred back to its initial place, ready for a new cycle round.

The method where a brush head body is moulded around groups of sweeping elements that have been melted together in one end is implemented in two steps by first positioning a plurality of said groups of sweeping elements in a mould and performing a first brush head moulding of a brush head body around said plurality of said groups of flexible sweeping elements creating an intermediate brush head, afterwards is second brush head moulding around the brush head body performed, creating a hygienic brush head. The moulding technique used to perform the two is known to anyone skilled in the art of moulding. The hygienic brush head or broom will have a smooth and even surface and which might have a moulded handle as well. During the second brush head moulding it is of most importance that no edges are being created at the transitions between the two castings. In one embodiment the second brush head moulding is conducted only after the brush head body has cooled for a predetermined time.

In one embodiment that time is at least 1 minute, at least 2 minutes, at least 3 minutes, at least 4 minutes, at least 5 minutes, at least 6 minutes, at least 7 minutes, at least 8 minutes. In a preferred embodiment the brush head body has cooled for 4 minutes before performing the second brush head moulding.

The melting is performed at a temperature and during a time period depending on the material of the bristle filaments. The temperature can be from 200-350 degree Celcius, preferably from 230-310 degrees Celcius, preferably from 260-280, degrees Celcius, preferably from 265-275 degrees Celcius, preferably around 270 degrees Celcius and the time can be from 10-25 seconds, preferably from 12-22 seconds, preferably from 15-19 seconds, preferably from 16-18, preferably around 17 seconds.

In an embodiment of the method the melting of one end of said group of hair-like elements is performed by heating an end surface of said group of hair-like elements for a predetermined period of time. The time can be from 10-25 seconds, preferably from 12-22 seconds, preferably from 15-19 seconds, preferably from 16-18, preferably around 17 seconds.

In an embodiment of the method the melting of one end of said groups of hair-like elements is performed by a machine or an object, e.g. a metal block configured for applying a temperature greater than the melting temperature of the flexible hair-like elements to the flexible hair-like elements.

In one embodiment the method further comprising establishing the position of the one end of the at least one group of flexible sweeping elements and when melting the one end with the melting module, the melting module is adjusted according to the position. The position of the one end of the group of flexible sweeping elements is established before melting the one end. When the melting of the one end with the melting module is happening, the melting module is adjusted according to the position. By establishing the position of the one end that has to be melted the melting module can be adjusted according to this position. This can ensure that the finish of the surface of the end of the bundle that has been melted is smooth an even and that all the individual bristle filaments are fused together. The establishing of the position gives a measure of the height of the flexible sweeping element.

The grouping module may also be configured to carry the collected group of flexible bristle filaments, also called flexible sweeping elements, to the place of establishing the position of the one end, also called height measurement in the following. The height measurement of the flexible sweeping elements is performed since the height of the bristle filaments can vary. This height measure is then used to adjust the height of the melting module that applied heat to the end of the bundle of filaments. In practice the measurement is performed by stamping the bristle filaments hold by the grouping module against a plate so that the individual filaments flush with each other and then measure the height of the bundle giving a measure of the average height of the bristle filaments. The flexible sweeping element is hereafter moved to the melting module where the one end of the bundle is melted.

In one embodiment the melting module is adjusted to 0.01/10-5/10 mm, preferably 0.05/10-3/10 mm, more preferably about 1/10 mm less than the established position of the one end of the at least one group of flexible sweeping elements. It has been found that when the melting module is adjusted to 0.01/10-5/10 mm, preferably 0.05/10-3/10 mm, more preferably about 1/10 mm less than the established position of the one end of the at least one group of flexible sweeping elements a very smooth an even surface of the end that has been melted is obtained. The melting ensures that all the bristle filaments are melted without being over-melted. The result of the adjusting of the melting module is that the finish of the surface of the end of the bundle that has been melted is smooth an even and that all the individual bristle filaments are fused together so that the bristle filaments in the individual sweeping elements do not loosen when the brush head is used.

In one embodiment a fix point of the grouping module is used as a reference point to the established position of the one end of the at least one group of flexible sweeping elements, thus essentially providing a length, or a height that easily can be used to control to the melting.

The melting module is for each individual flexible sweeping elements adjusted in height-level according to the established position of the one end of the at least one group of flexible sweeping elements (the measured height of the individual flexible sweeping elements) so that all of the individual flexible sweeping element obtains consistent degree of melting. In a preferred embodiment the melting of the individual groups of flexible sweeping elements is performed by setting the height-level of the melting module to be 1/10 mm less than the established position of the one end of the at least one group of flexible sweeping elements (the measured height of the individual groups of flexible sweeping elements).

In one embodiment the gliding the flexible sweeping elements positioned in the grouping module away from the melting module in a direction substantially perpendicularly to the longitudinal direction of the flexible bristle filaments happens after the melting is accomplished. The flexible sweeping elements positioned in the grouping module is glided away from the melting module after the melting is accomplished, this while the melting module is stationary being kept in position. This has the advantage that the melting module does not accidental pull out threads from the bristle filaments or pull up the whole sweeping element from the grouping module that they are positioned in when the melting is finished and the melting module is transferred back to its initial place, ready for a new cycle round.

In an embodiment the method comprises encapsulating the melted end of the at least one group of flexible sweeping elements in a bristle carrier. This step is to be performed just before the step of positioning a plurality of the groups of flexible sweeping elements in a mould, and performing a first brush head moulding of the brush head body around the plurality of the groups of flexible sweeping elements creating an intermediate brush head.

The brush head has a bristle surface penetrated by the bristle filaments and the surface being formed by both the first component forming the encapsulated part and the second component forming the brush head body.

This further minimizes the risk of losing broom hairs since each group of hair-like elements (flexible sweeping elements) is encapsulated in a bristle carrier part before a plurality of these encapsulated groups of hair-like elements is positioned in a mould, and the brush head body is moulded around said plurality of groups of hair-like elements. Further, this embodiment also minimizes the tendency of formation of cracks and holes around each hair, resulting in fewer hiding places for dirt.

The bristle carrier formed squeezed the bristle filaments very tightly together creating a barrier making it hard for bacteria and dirt to enter in between the bristle filaments and into the interior of the bristle carrier.

The sweeping element is in one embodiment encapsulated by the bristle carrier only in the very lowest end of the bundle that has been melted. This means that the bristle filaments do not protrude deeply into the moulded bristle carrier. The reason for this is that the hiding places for dirt and bacteria between the individual hairs that are encapsulated are minimized when the end of the bristle filaments are positioned high up in the carrier.

According to one embodiment, the grouping module may include a set of prongs or clamps to hold the group of flexible bristle filaments. Further, according to another embodiment, there may be a plurality of the grouping modules.

Typically, the moulding forms used to mould the bristle carrier, performing the first brush head moulding of the brush head body and performing the second brush head moulding are made of steel since they are robust and durable and can easily resist the pressure applied under the injection mouldings.

In one embodiment of the invention the bristle filaments grouped into flexible sweeping elements are made from polymers or any other suitable material with elastic properties, such as polystyrene (PS), polyethylene terephthalate (PET) or polybutylene terephthalate (PBT). This improves the flexibility of the sweeping elements, and thus improves the cleaning effect of the sweeping elements. In a preferred embodiment the the bristle filaments grouped into flexible sweeping elements are made from PBT.

In accordance with an embodiment of the invention the hygienic brush head may be of a circular, square, rectangle or any other shape as desired by the manufacturer. Further, the brush head is made of any suitable material such as, but not limited to, plastics and polymers. Here the brush head refers to both the intermediate brush head and the finished brush head after performing both the first and the second brush head mouldings. In accordance with an embodiment of the invention, the material used for the first brush head moulding and the second brush head moulding are polyethylene terephthalate (PET). In accordance with another embodiment of the invention, the material used for the first brush head moulding and the second brush head moulding are polybutylene terephthalate (PBT). In accordance with a preferred embodiment of the invention, the material used for the first brush head moulding and the second brush head moulding are polypropylene (PP). So both the first brush head moulding of the brush head body and the material used under the second brush head moulding are the same material, preferably PP.

In accordance with an embodiment of the invention the bristle carrier is made from any suitable material such as, but not limited to, plastics and polymers. In accordance with an embodiment of the invention, the bristle carrier is made from polypropylene (PP). In accordance with another embodiment of the invention, the bristle carrier is made from polyethylene terephthalate (PET). In accordance with another embodiment of the invention, the bristle carrier is preferably made from polybutylene terephthalate (PBT).

The present invention also comprises a brush head or broom manufactured by the method of the present invention. The difference between a brush head and a broom is that a broom can have a handle. If there is a handle this can be moulded as part of the second brush head moulding of the intermediate brush head. But the handle can also be attached to the brush head separately. The brush head or broom comprises groups of hair-like elements that are melted together in one end and moulded in the brush head body. The brush head or broom can also comprise groups of hair-like elements that are melted together in one end and are encapsulated in a moulded bristle carrier part before these moulded bristle carrier parts are moulded in the brush head body. Since the brush head has interconnected groups of hair-like elements it is secured that the hair-like elements in the individual sweeping elements do not loosen when the brush head is used.

In accordance with an embodiment of the invention the brush head or broom has groups of hair-like elements that are melted together in one end and are encapsulated in a moulded bristle carrier part. These moulded bristle carriers are moulded in the brush head body. Since the brush head or broom has interconnected groups of hair-like elements that are first of all melted together and secondly moulded together in a bristle carrier, it is secured that the hair-like elements in the individual sweeping elements do not loosen when the brush head is used. This entails a brush head that is extra solid. The individual hair-like elements cannot as easily loosen from the group of which they are part, since the hair-like elements are first of all interconnected in each group by melting and secondly by having a moulded bristle carrier around the group, securing that the hair-like elements in the individual sweeping elements do not loosen when the brush head is used.

BRIEF DESCRIPTION OF THE DRAWINGS

The above and other features and advantages of the present invention will become readily apparent to those skilled in the art by the following detailed description of exemplary embodiments thereof with reference to the attached drawings, in which.

DETAILED DESCRIPTION

Figure 1:
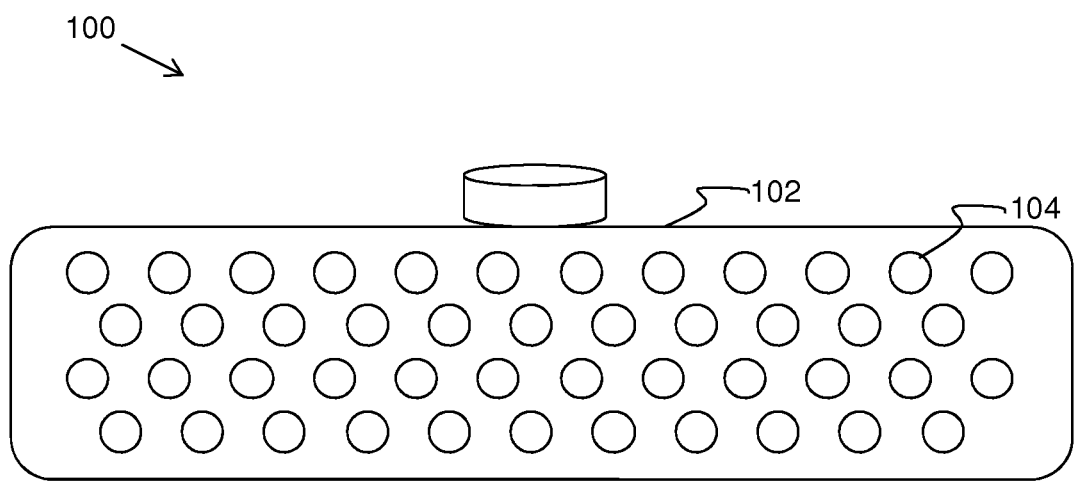
FIG. 1 shows a conventional broom (prior art)

The figures are schematic and simplified for clarity reasons, and they merely show details which are essential to the understanding of the invention, while other details have been left out. Throughout, the same reference numerals are used for identical or corresponding parts. It should be noted that the terms bristle filaments and flexible hair-like elements have been used interchangeably in the patent application and that the terms flexible sweeping elements and bundles of bristle filaments have been used interchangeably.

FIG. 1 illustrates a conventional broom (prior art). The broom (100) comprises a broom stick (not shown), a brush head (102) and flexible sweeping elements (104). The broom stick is to be attached to a top end of the brush head (102) and the flexible sweeping elements (104) are positioned on the brush head (102). Also, the sweeping elements protrude from the bottom end of the brush head (102) in order to contact the surface during sweeping. The sweeping elements can be groups of flexible bristle filaments.

Figure 2:
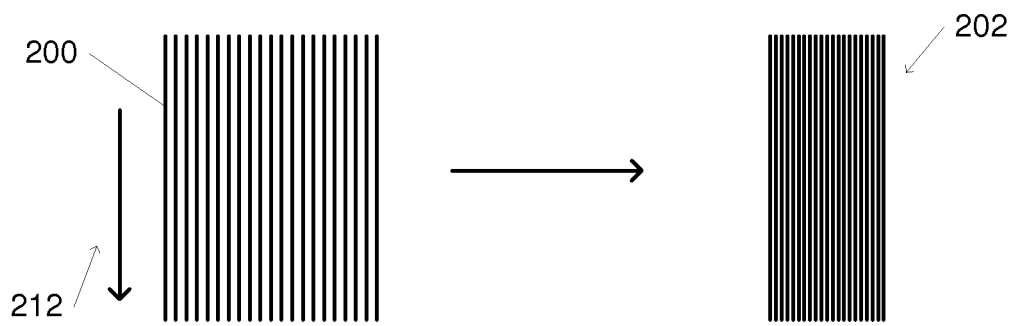
FIG. 2 illustrates the step where hairs are grouped.

FIG. 2 illustrates a first step of the method where bristle filaments (200) extending in a longitudinal direction (212) are collected in groups (202). The bristle filaments are collected from a feeding source, the source can accommodate multiple bristle filaments. This step can be performed manually but more often the bristle filaments are collected in groups with the assistance of a machine, here called a grouping module. The grouping module (not shown in the figure) collects the flexible bristle filaments and holds them in a firm grip. The flexible sweeping element can hereafter be moved to the melting module (not shown in the figure) where the one end (204) of the bundle is melted which is shown in FIG. 3.

Figure 3:
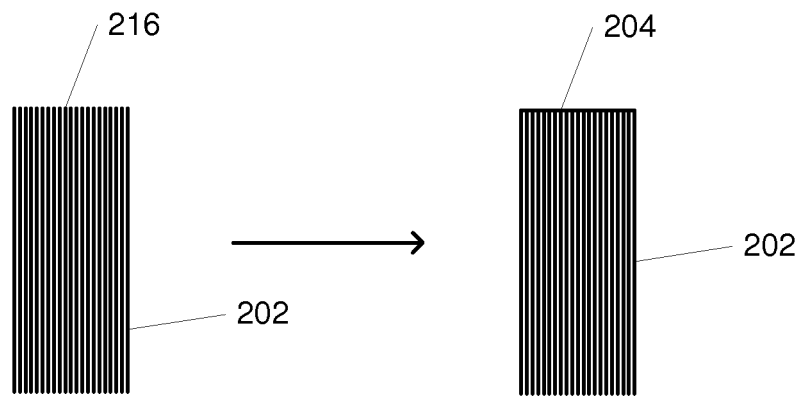
FIG. 3 illustrates that the ends are melted.

FIG. 3 illustrates the step of the method where the ends of the collected bristle filaments (202) are melted (204) by a melting module (not shown in the figure). The melting module is configured to melt one end of the group of bristle filaments (204) to form a fused end (204). The melting module may be a machine or an object, e.g. a metal block configured for applying a temperature higher than the melting temperature of the flexible bristle filaments to the flexible bristle filaments.

After the melting, the method comprises gliding the flexible sweeping elements positioned in the grouping module away from the melting module in a direction substantially perpendicularly to the longitudinal direction of the flexible bristle filaments. The flexible sweeping elements positioned in the grouping module is hereby glided away from the melting module after the melting is accomplished, this while the melting module is stationary being kept in position. By gliding/turning the flexible sweeping elements relative to the melting module the filaments are fused together more thorough, since the flexible sweeping elements positioned in the grouping module are still in contact with the melting module during the gliding. In one embodiment the flexible sweeping elements positioned in the grouping module turns a few degrees (2-3 degrees) perpendicularly to the longitudinal direction of the flexible bristle filament. This entails the further advantage that the melting module does not accidental pull out threads from the bristle filaments or pull up the whole sweeping element from the grouping module that they are positioned in when the melting is finished and the melting module is transferred back to its initial place, ready for a new cycle round. The melting ensures that all the bristle filaments are melted without being over-melted ensuring a smooth surface of the end that has been melted. The result of the melting is that the finish of the surface of the end of the bundle that has been melted is smooth an even and that all the individual bristle filaments are fused together.

In one embodiment the gliding of the flexible sweeping elements positioned in the grouping module away from the melting module in a direction substantially perpendicularly to the longitudinal direction of the flexible bristle filaments comprises gliding apart the flexible sweeping elements positioned in the grouping module and the melting module substantially perpendicularly to the longitudinal direction of the flexible bristle filaments.

In one embodiment when the flexible sweeping elements positioned in the grouping module are glided away from the melting module in a direction substantially perpendicularly to the longitudinal direction of the flexible bristle filaments and the melting is finished, the melting unit is lifted and moved away from the place of melting and is transferred back to its initial place, ready for a new cycle round.

According to one of the embodiments, the grouping module may include a set of prongs or clamps to hold the group of flexible bristle filaments. Further, according to another embodiment, there may be a plurality of the grouping modules.

In an embodiment the position of the one end (214) of the group of flexible sweeping elements is established before melting the one end (204). This establishing of the position is not shown in the figures. When the melting of the one end with the melting module is happening, the melting module is adjusted according to the position. A fix point of the grouping module can be used in establishing the position of the one end. By establishing the position of the one end that has to be melted the melting module can be adjusted according to this position. This can ensure that the finish of the surface of the end of the bundle that has been melted is smooth an even and that all the individual bristle filaments are fused together. The establishing of the position gives a measure of the height of the flexible sweeping element.

The grouping module may also be configured to carry the collected group of flexible bristle filaments, also called flexible sweeping elements, to the place of establishing the position of the one end (214), also called height measurement in the following. The height measurement of the flexible sweeping elements is performed since the height of the bristle filaments can vary. This height measure is then used to adjust the height of the melting module that applied heat to the end of the bundle of filaments. In practice the measurement is performed by stamping the bristle filaments hold by the grouping module against a plate so that the individual filaments flush with each other and then measure the height of the bundle giving a measure of the average height of the bristle filaments. A fix point of the grouping module can be used in establishing the position of the one end other than the end that has to be melted. The flexible sweeping element is hereafter moved to the melting module where the one end of the bundle is melted which is shown in FIG. 3.

In one embodiment the melting module is adjusted to 0.01/10-5/10 mm, preferably 0.05/10-3/10 mm, more preferably about 1/10 mm less than the established position of the one end of the at least one group of flexible sweeping elements.

In a preferred embodiment the melting is performed by a melting module comprising a melting plate. The melting module is for each individual flexible sweeping elements adjusted in height-level according to the established position of the one end of the at least one group of flexible sweeping elements (the measured height of the individual flexible sweeping elements) so that all of the individual flexible sweeping element obtains consistent degree of melting. In a preferred embodiment the melting of the individual groups of flexible sweeping elements is performed by setting the height-level of the melting module to be 1/10 mm less than the established position of the one end of the at least one group of flexible sweeping elements (the measured height of the individual groups of flexible sweeping elements). The melting is performed at a temperature and during a time period depending on the material of the bristle filaments. The temperature can be from 200-350 degree Celcius, preferably from 230-310 degrees Celcius, preferably from 260-280, degrees Celcius, preferably from 265-275 degrees Celcius, preferably around 270 degrees Celcius and the time can be from 10-25 seconds, preferably from 12-22 seconds, preferably from 15-19 seconds, preferably from 16-18, preferably around 17 seconds.

The height-level load applied by the melting module to the bundle, preferably set to be 1/10 mm less than the measured height of the individual groups of flexible sweeping elements, is the same for all the bundles. This is ensured since the bundle is first measured in heights followed by that that information is supplied to the melting module. The melting module then adjust the height-level load to apply to that specific bundle that is about to be melted by the melting module.

By the process described is obtained a flexible sweeping element of bristle filaments that has a smooth an even surface finish of the end of the bundle that has been fused together.

By melting and fusing the bristle filaments together in one end (204) before moulding the brush head body around the groups of bristle filaments, it is secured that each specific bristle filament are interconnected in groups, securing that the bristle filaments in the individual sweeping elements do not loosen when the brush head is used. Especially, by melting the bristle filaments together in one end before moulding the brush head around the bundle, it is secured that the center hairs, which in prior art brooms have a tendency to fall out, do not fall off the broom during use.

Figure 4A:
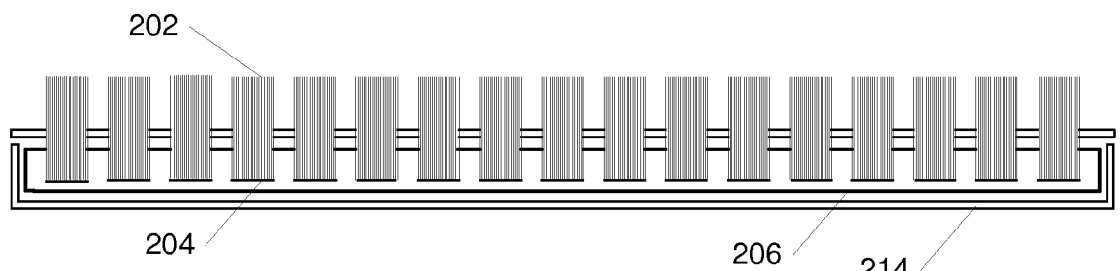
FIGS. 4 a, b and c illustrate the step where a brush head is moulded around groups of sweeping elements, FIGS. 5 a, b, c and d illustrate an additional step between the melting step and the step where a brush head is moulded around groups of sweeping elements, where each sweeping element is given a moulded bristle carrier, FIGS. 6 a and b illustrate a broom made according to the present invention comprising a brush head according to the present invention, FIGS. 7 a and b illustrate another broom made according to the present invention comprising a brush head according to the present invention.
Figure 4B:
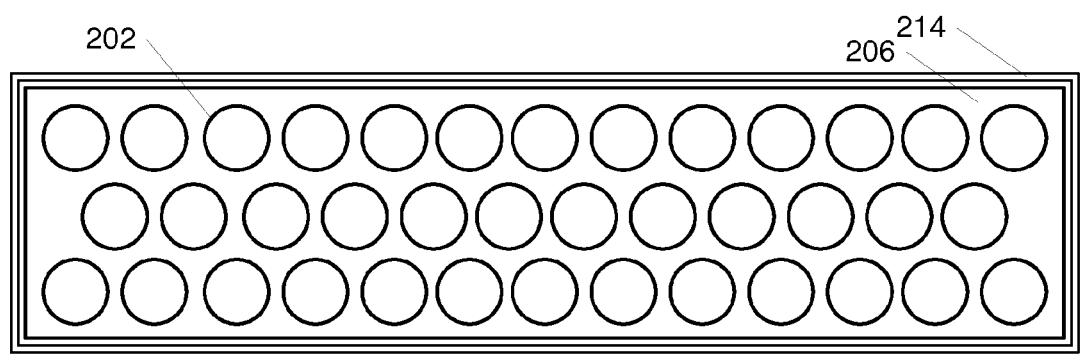
Figure 4C:
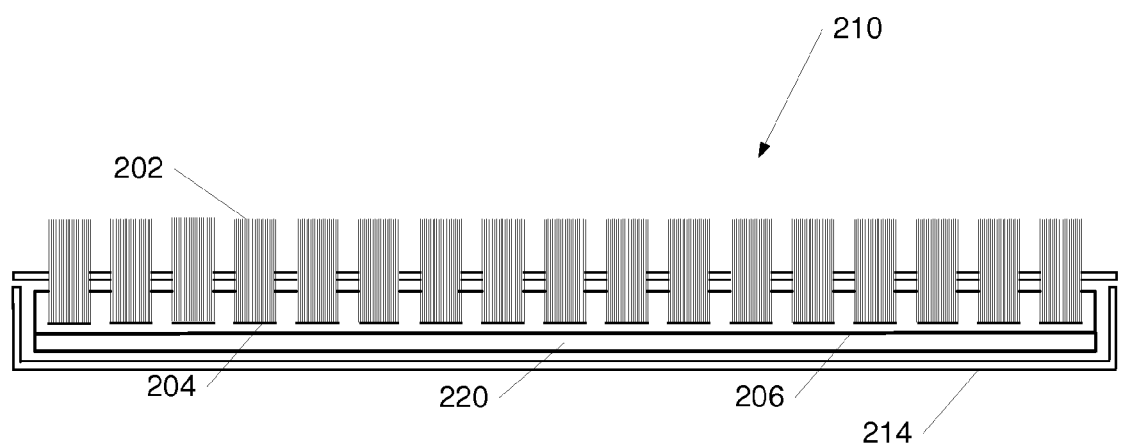

FIGS. 4 a, b and c illustrate a further step of the method (overall moulding module) where a brush head body (206) is moulded around groups of sweeping elements (202) that have been melted together in one end (204) according to the description above. This is implemented in two steps by first positioning a plurality of said groups of sweeping elements (202) in a mould (214), and performing a first brush head moulding of a brush head body (206) around said plurality of said groups of flexible sweeping elements (202), afterwards is second brush head moulding (220) of the brush head body (206) performed, creating a hygienic brush head (210).

The moulding technique used to perform the two is known to anyone skilled in the art of moulding. The hygienic brush head or broom will have a smooth and even surface (360 degree surface) and which might have a moulded handle as well. During the second brush head moulding it is of most importance that no edges are being created at the transitions between the two castings. In one embodiment the second brush head moulding is conducted only after the brush head body has cooled for a predetermined time. In one embodiment that time is at least 1 minute, at least 2 minutes, at least 3 minutes, at least 4 minutes, at least 5 minutes, at least 6 minutes, at least 7 minutes, at least 8 minutes. In a preferred embodiment the brush head body has cooled for 4 minutes before performing the second brush head moulding.

The finished brush head or broom can have any kind of shape and a handle or no handle depending on the use of the finished brush.

The number of sweeping elements (202) to be moulded in the brush head body (206) can vary greatly dependent on the use of the brush head. The number of sweeping elements also depends on the number of individually hair-like elements in each sweeping elements and may vary dependent on the shape, thickness and material of the individual hair-like elements and on the use of the brush head. The overall shape of the sweeping elements (202) can also vary greatly depending on the use of the brush head. The shape can be round, oval, oblong, square, rectangular or any other shape as desired. The pattern in which the plurality of flexible sweeping elements is oriented according to one another and moulded in the brush head (206) may be of any type of pattern and is not limited to the patterns as shown in the figures.

FIGS. 5 a, b, c and d illustrate an alternative extra step of the method (encapsulating moulding module for creating a bristle carrier) to be performed after the melting step and before the moulding of a brush head body, where each melted and fused sweeping elements (202) is given a moulded encapsulating part (208). The grouping module may carry the group of fused flexible hair-like elements (202) from the melting module to the encapsulating moulding module. The grouping module may hold the group of fused flexible hair-like elements (202) while the encapsulating moulding module moulds the bristle carrier (208) around the fused end (204) of the group of fused flexible hair-like elements (204). This step of moulding a moulded bristle carrier (208) around each group of sweeping elements (202), before a plurality of said sweeping elements is positioned in a mould, and said brush head body (206) is moulded around said plurality of sweeping elements (202), is advantageous, since this minimizes the risk of losing broom hairs (200) since each group of hair-like elements (202) is encapsulated in a moulded part (208) before a plurality of these encapsulated groups of hair-like elements is positioned in a mould, and the brush head body (206) is moulded around said plurality of groups of hair-like elements creating an intermediate brush head. As shown in FIGS. 5 c and d, another advantage obtained by incorporating the sweeping elements in a moulded carrier part is that the hair-like elements can be held together in a firm grip by the moulded material which reduces the risk of holes between the individual hair-like elements as compared to if the melted and fused group of hair-like elements (202) was not given a moulded carrier part. How close together the individual hair-like elements are positioned is determined by the mould used and the pressure applied by that specific mould to the bristle filaments. The bristle carrier formed squeezed the bristle filaments very tightly together creating a barrier making it hard for bacteria and dirt to enter in between the bristle filaments and into the interior of the bristle carrier.

By incorporating an extra step in the process of making a brush head, a brush head that is extra solid is obtained. The individual hair-like elements (200) cannot as easily loosen from the group of which they are part since the hair-like elements are first of all interconnected in each group by melting (204) and secondly by having a moulded bristle carrier part (206) around the group, securing that the hair-like elements (200) in the individual sweeping elements do not loosen when the brush head is used. Further, this embodiment also minimizes the tendency of formation of cracks and holes around each hair, resulting in fewer hiding places for dirt. The step is implemented by positioning the sweeping element, initially melted together as described above, in a mould (214), and moulding a moulded bristle carrier (208) around the sweeping element. The moulding technique used to mould the moulded carrier part around the sweeping element is known to anyone skilled in the art of moulding. Thereafter, the bristle carrier with the sweeping element incorporated there into is transferred to the overall moulding module (first and second brush head moulding) for moulding the brush head around a number of bristle carriers with the sweeping element incorporated there into, as described in connection with FIGS. 4 a b and c.

The bristle carrier is arranged in this mould so that the bristle surface of the bristle carrier where the bristle filaments penetrates from the bristle carrier is held flush with the inner surface in the mould. The bristle carrier contacts planarly the inner surface of the one half of the mould form which comprises perforations/holes that the bristle filaments protrude through. The surface of the bristle carrier seals the ducts for accommodating the bristle filaments in the one half of the mould. The pressure applied on the bristle carriers positioned in the one half of the mould is preferably about 60 Ton but the pressure could be another value chosen by the skilled person. This further entails a sealing of the ducts. The pressure applied during the injection moulding is preferably about 300 bars but the pressure could be another value chosen by the skilled person.

The sweeping element is in one embodiment encapsulated by the bristle carrier only in the very lowest end of the bundle that has been melted as shown in FIG. 5d. This means that the bristle filaments do not protrude deeply into the moulded bristle carrier. The reason for this is that the hiding places for dirt and bacteria between the individual hairs that are encapsulated are minimized when the end of the bristle filaments are positioned high up in the carrier.

During the first brush head moulding where the sweeping element—encapsulated into a bristle carrier or not—is moulded into a brush head body both a mechanical binding and a chemical binding take place between the sweeping element or bristle carrier and the material making up the brush head body.

During the moulding step where the sweeping element is encapsulated by a bristle carrier both a mechanical binding and a chemical binding take place between the sweeping element (bristle filaments) and the material making up the bristle carrier.

Also during the second brush head moulding where the brush head body is moulded with a moulding material both a mechanical binding and a chemical binding take place between the brush head body and the material making up the rest of the brush head.

In accordance with an embodiment of the invention, the plurality of hair-like elements (bristle filaments) may be made from polymers or any other material with elastic properties. In accordance with an embodiment of the invention, the hair-like elements are made from polystyrene (PS). In accordance with an embodiment of the invention, the hair-like elements are made from polyethylene terephthalate (PET). In accordance with an embodiment of the invention, hair-like elements are made from polybutylene terephthalate (PBT). The number of individually hair-like elements (200) in each group (202) may vary dependent on the shape, thickness and material of the individual hair-like elements and on the use of the brush head. The overall shape of the group of individual hair-like elements can also vary greatly depending on the use of the brush head. The shape can be round, oval, oblong, square, rectangular or any other shape as desired.

In one embodiment the bristle filaments is PBT and the brush head body is PP.

In one embodiment both the bristle filaments and the bristle carrier material is PBT.

In one embodiment both the bristle filaments and the bristle carrier material is PBT and the brush head body is PP.

In one embodiment both the bristle filaments and the brush head body is PBT.

In one embodiment both the bristle filaments and the bristle carrier material is PBT.

In one embodiment the bristle filaments, the bristle carrier material and the brush head body is PBT.

Figure 6A:
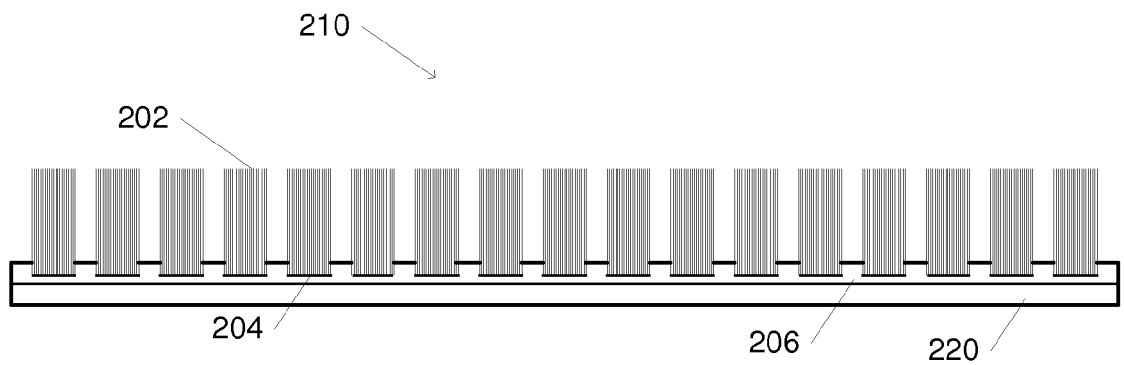
Figure 6B:
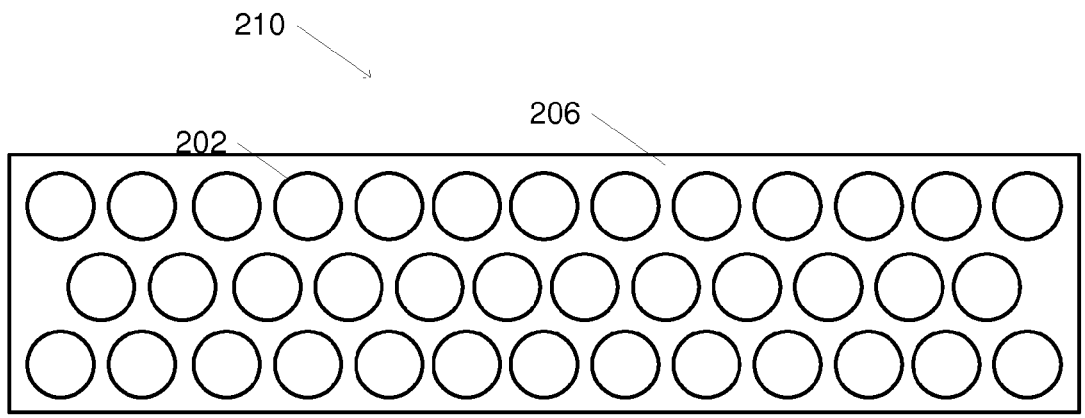

FIGS. 6 a and b illustrate a hygienic brush head or a broom (210) with a brush head made according to the present method. In the brush head/broom in this figure the groups of hair-like elements (202) are melted together in one end (204) before the brush head body (206) is moulded around a plurality of groups of hair-like elements (202). A brush head or broom (210) like the one in the figure, has interconnected bristle filaments securing that the hair-like elements in the individual sweeping elements (202) do not loosen when the broom is used.

Figure 7A:
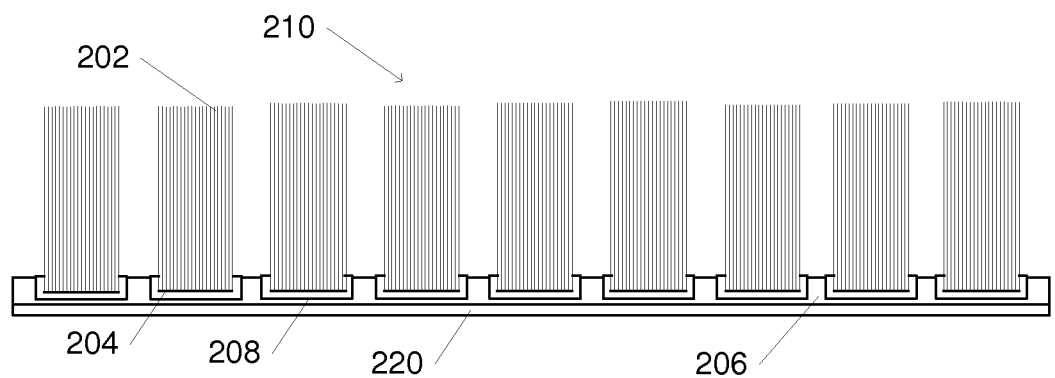
Figure 7B:
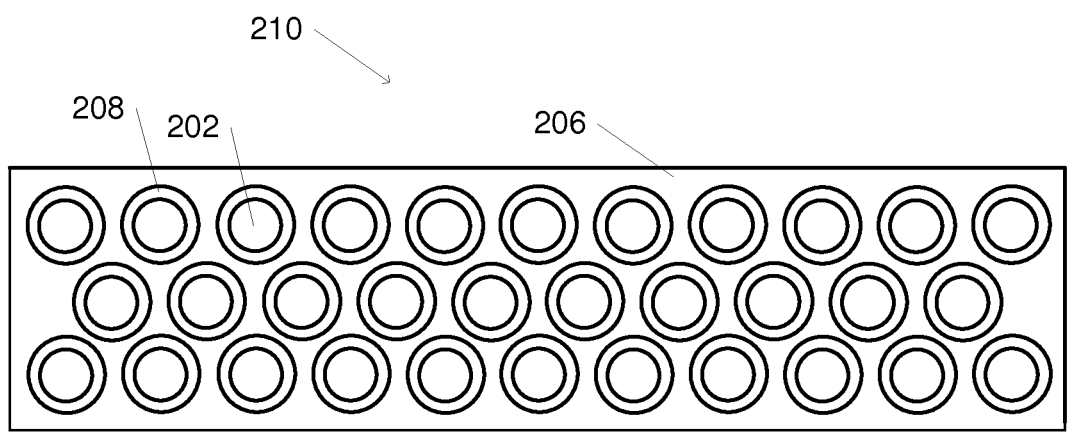

FIGS. 7 a and b illustrate a hygienic brush head or a broom (210) with a brush head made according to the present method. In the brush head/broom in this figure the groups of hair-like elements (202) are melted together in one end (204) and encapsulated in a moulded bristle carrier (208) before the brush head body (206) is moulded around a plurality of encapsulated groups of hair-like elements. By incorporating an extra step in the process of making a broom, a brush head/broom that is extra solid is obtained. The individual hair-like elements cannot as easily loosen from the group of which they are part since the bristle filaments are first of all interconnected by melting and secondly by having a moulded bristle carrier around the group of bristle filaments, securing that the bristle filaments in the individual sweeping elements do not loosen when the broom is used.

The brush head and the broom made by the method of the present invention with these flexible, hair-like elements can be used to clean and sweep any kind of surfaces e.g. in houses, outdoor, in hospitals, in experimental laboratories and intensive care units.

The brush heads and brooms that are produced by the method according to the present invention have been developed in line with the general principles of good hygienic design. These general principles maximise the ability of the brush heads and brooms themselves to be quickly, easily and effectively decontaminated and thus not become a source or vector for contamination.

The design of the brush heads and brooms according to the present invention all utilise food contact approved, non-absorbent, un-painted or coated, durable materials of construction, have smooth convex surfaces, thereby making them easier to clean and eliminating hollows where liquids and debris could accumulate.

All merging bodies, surfaces and edges of the brush heads and the brooms are designed with clean and smooth transitions and large edge rounding's to ensure both ease of cleaning and hygienic expression.

Figure 8:
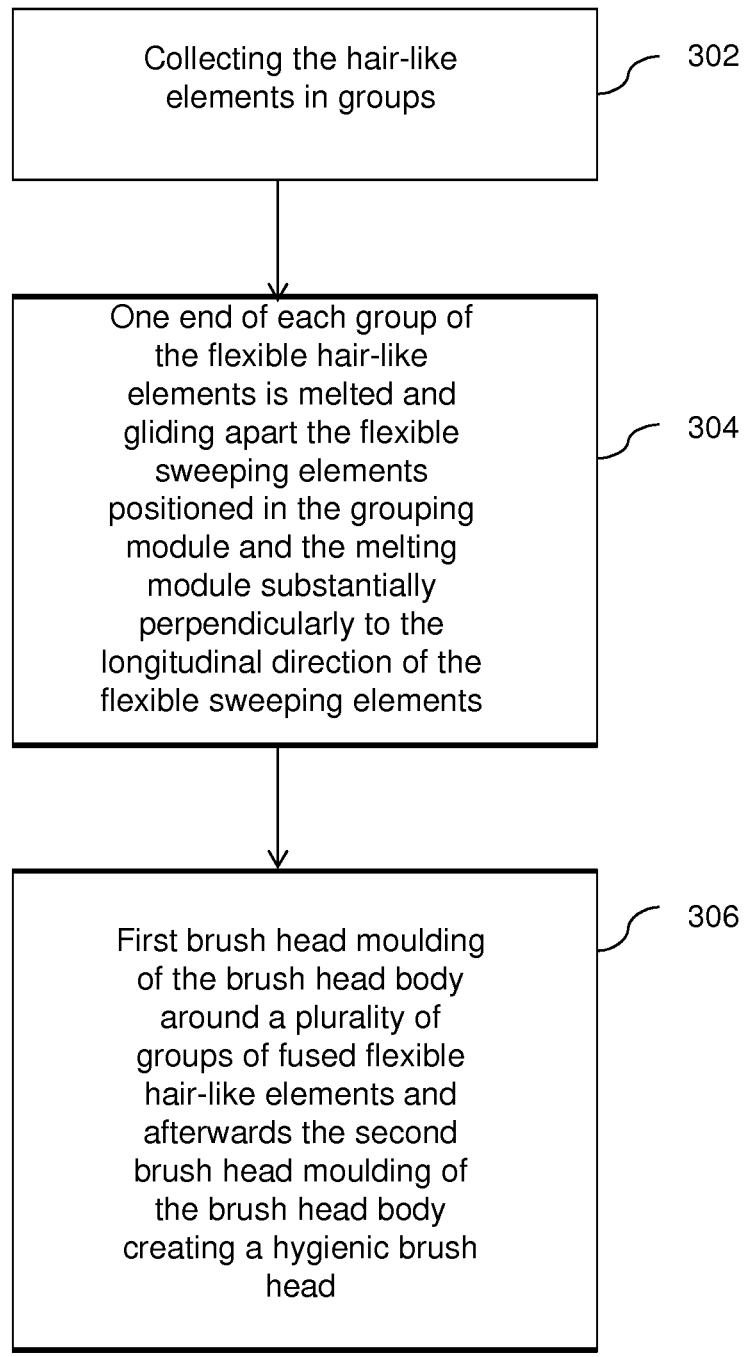
FIG. 8 illustrates a flow chart describing the steps for making a brush head, in accordance with an embodiment of the present invention.

FIG. 8 illustrates a flow chart describing the steps of making a brush head in accordance with an embodiment of the present invention. At 302, a plurality of flexible hair-like elements is collected in groups from the source. At 304, the one end of each group of the flexible hair-like elements is melted to obtain a group of fused flexible hair-like elements and gliding apart the flexible sweeping elements positioned in the grouping module and the melting module substantially perpendicularly to the longitudinal direction of the flexible bristle filaments. Thereafter, at 306, a plurality of said groups of fused flexible hair-like elements is positioned in a mould, followed by the first brush head moulding of the brush head body around the plurality of the groups of fused flexible hair-like elements creating an intermediate brush head and afterwards the second brush head moulding around the brush head body creating a hygienic brush head. At 304 the position of the one end of the at least one group of flexible sweeping elements can be established before the melting and when melting the one end with the melting module the melting module is adjusted according to the position.

Figure 9:
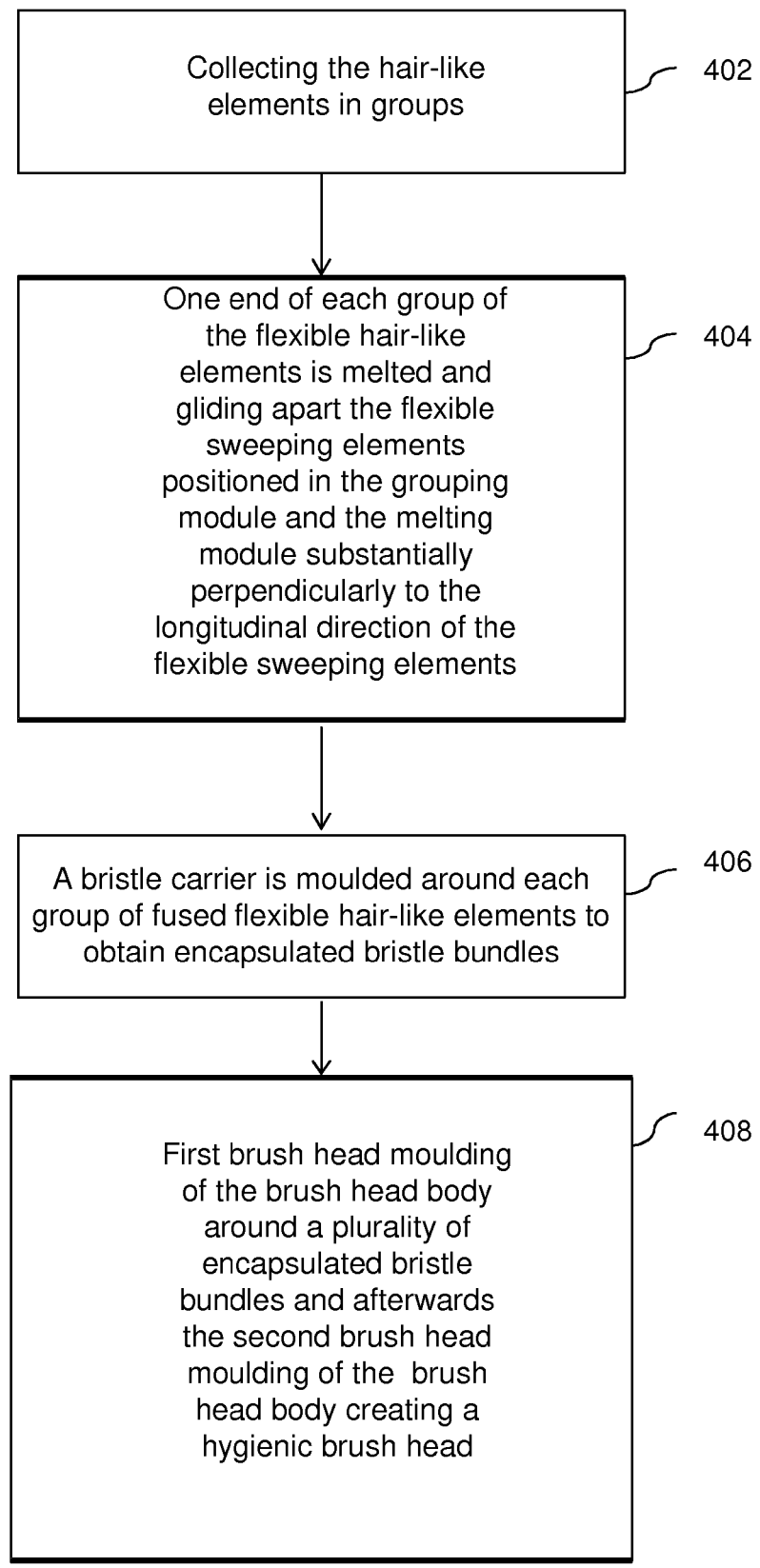
FIG. 9 illustrates a flow chart describing the steps for making a brush head, in accordance with an alternative embodiment of the present invention.

FIG. 9 illustrates a flow chart describing the steps of making a brush head in accordance with an alternative embodiment of the present invention. At 402, a plurality of flexible hair-like elements is collected in groups from the source. At 404, the one end of each group of flexible hair-like elements is melted to obtain a group of fused flexible hair-like elements and gliding apart the flexible sweeping elements positioned in the grouping module and the melting module substantially perpendicularly to the longitudinal direction of the flexible bristle filaments. At 406, the bristle carrier is moulded around each group of fused flexible hair-like elements to obtain encapsulated bristle bundles. Thereafter, at 408, a plurality of said encapsulated bristle bundles is positioned in a mould, followed by the first brush head moulding of the brush head body around the plurality of said encapsulated bristle bundles creating an intermediate brush head and afterwards the second brush head moulding around the i brush head body creating a hygienic brush head.

It should be noted that in addition to the exemplary embodiments of the invention shown in the accompanying drawings, the invention may be embodied in different forms and should not be construed as limited to the embodiments set forth herein. Rather, these embodiments are provided so that this disclosure will be thorough and complete, and will fully convey the concept of the invention to those skilled in the art.

REFERENCE LIST flexible bristle filaments (200)
flexible sweeping elements/groups of bristle filaments (202)
melted end (204)
first brush head moulding of a brush head body (206)
bristle carrier/moulded encapsulating part (208)
brush head/broom (210)
longitudinal direction (212)
mould (214)
the position of the one end (216)
second brush head moulding (220)
fix point of the grouping module (not shown in the figure)
grouping module (not shown in the figure)
melting module (not shown in the figure)

The invention claimed is:

1. A method of manufacturing a hygienic brush head for cleaning articles, where the brush head comprises a plurality of flexible bristle filaments extending in a longitudinal direction grouped into flexible sweeping elements being connected to a moulded brush head body, the method comprising:
    collecting the flexible bristle filaments in a grouping module creating at least one group of flexible sweeping elements,
    melting one end of the at least one group of flexible sweeping elements using a melting module, creating a melted end,
    gliding the flexible sweeping elements positioned in the grouping module away from the melting module in a direction substantially perpendicularly to the longitudinal direction of the flexible bristle filaments, where the flexible sweeping elements positioned in the grouping module are in contact with the melting module during the gliding of the flexible sweeping elements positioned in the grouping module,
    positioning a plurality of the groups of flexible sweeping elements in a mould, and performing a first brush head moulding of a brush head body around the plurality of the groups of flexible sweeping elements, and
    performing a second brush head moulding around the brush head body thereby creating a hygienic brush head.

2. The method according to claim 1 further comprising:
    establishing a position of the one end of the at least one group of flexible sweeping elements
    and when melting the one end with the melting module, the melting module is adjusted according to the position.

3. The method according to claim 2, where a fix point of the grouping module is used in establishing the position of the one end of the at least one group of flexible sweeping elements.

4. The method according to claim 2, where the melting module is adjusted to 0.01/10-5/10 mm less than the established position of the one end of the at least one group of flexible sweeping elements.

5. The method according to claim 2, where the melting module is adjusted to 0.05/10-3/10 mm less than the established position of the one end of the at least one group of flexible sweeping elements.

6. The method according to claim 2, where the melting module is adjusted to about 1/10 mm less than the established position of the one end of the at least one group of flexible sweeping elements.

7. The method according to claim 1, where gliding the flexible sweeping elements positioned in the grouping module away from the melting module in a direction substantially perpendicular to the longitudinal direction of the flexible bristle filaments, happens after the melting is accomplished.

8. The method according to claim 1, the method further comprising encapsulating the melted end of the at least one group of flexible sweeping elements in a bristle carrier.

9. The method according to claim 8, wherein the bristle carrier is made from polybutylene terephthalate (PBT).

10. The method according to claim 1, wherein the bristle filaments are made from polybutylene terephthalate (PBT).

11. The method according to claim 1, wherein material used for the first brush head moulding and the second brush head moulding comprises polypropylene (PP).

12. A brush head or broom manufactured by the method of claim 1.

* * * * *

UNITED STATES PATENT AND TRADEMARK OFFICE
CERTIFICATE OF CORRECTION

| | | |
|---|---|---|
| PATENT NO. | : 9,204,712 B2 | Page 1 of 1 |
| APPLICATION NO. | : 14/380204 | |
| DATED | : December 8, 2015 | |
| INVENTOR(S) | : Børge Rasmussen | |

It is certified that error appears in the above-identified patent and that said Letters Patent is hereby corrected as shown below:

<u>In the Claims</u>

In column 14, claim 1, line 33, after "direction substantially" replace "perpendicularly" with --perpendicular--.

Signed and Sealed this
Nineteenth Day of April, 2016

Michelle K. Lee
*Director of the United States Patent and Trademark Office*